(12) United States Patent
Dobra et al.

(10) Patent No.: US 7,328,220 B2
(45) Date of Patent: Feb. 5, 2008

(54) SKETCH-BASED MULTI-QUERY PROCESSING OVER DATA STREAMS

(75) Inventors: Alin Dobra, Gainesville, FL (US); Johannes Gehrke, Ithaca, NY (US); Rajeev Rastogi, New Providence, NJ (US); Minos Garofalakis, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 409 days.

(21) Appl. No.: 11/025,211

(22) Filed: Dec. 29, 2004

(65) Prior Publication Data

US 2006/0161566 A1    Jul. 20, 2006

(51) Int. Cl.
    *G06F 17/00* (2006.01)
(52) U.S. Cl. .......................................... 707/101; 707/6
(58) Field of Classification Search ................ 707/1–6, 707/10, 100–102, 103 R, 104.1, 205
    See application file for complete search history.

(56) References Cited

U.S. PATENT DOCUMENTS

| | | | | |
|---|---|---|---|---|
| 5,701,460 | A | * | 12/1997 | Kaplan et al. .................. 707/3 |
| 5,706,494 | A | * | 1/1998 | Cochrane et al. ............... 707/2 |
| 5,758,335 | A | * | 5/1998 | Gray ............................. 707/2 |
| 5,991,754 | A | * | 11/1999 | Raitto et al. ................... 707/2 |
| 6,516,310 | B2 | * | 2/2003 | Paulley .......................... 707/2 |
| 7,020,649 | B2 | * | 3/2006 | Cochrane et al. ............... 707/3 |
| 7,184,998 | B2 | * | 2/2007 | Nica ............................. 707/2 |

OTHER PUBLICATIONS

Alin Dobra et al., Processing Complex Aggregate Queries Over Data Streams, Jun. 2002, ACM SIGMOD, ISBN: 1-58113-497-5, pp. 61-72.*
Anna C. Gilbert et al., Surfing Wavelets on Streams: One- Pass Summaries for Approximate Aggregate Queries, Sep. 2001, Morgan Kaumann Publishers Inc., ISBN 155860-804-4, pp. 78-78-87.*
U.S. Appl. No. 10/954,901, filed Sep. 30, 2004, Sumit Ganguly et al.
U.S. Appl. No. 11/025,578, filed Dec. 29, 2004, Sumit Ganguly et al.
U.S. Appl. No. 11/025,355, filed Dec. 29, 2004, Sumit Ganguly et al.

(Continued)

*Primary Examiner*—Jeffrey Gaffin
*Assistant Examiner*—Jacques Veillard (57) ABSTRACT

A method of efficiently providing estimated answers to workloads of aggregate, multi-join SQL-like queries over a number of input data-streams. The method only examines each data elements once and uses a limited amount of computer memory. The method uses join graphs and atomic sketches that are essentially pseudo-random summaries formed using random binary variables. The estimated answer is the product of all the atomic sketches for all the vertices in the query join graph. A query workload is processed efficiently by identifying and sharing atomic sketches common to distinct queries, while ensuring that the join graphs remain well formed. The method may automatically minimize either the average query error or the maximum query error over the workload.

13 Claims, 5 Drawing Sheets

OTHER PUBLICATIONS

S. Ganguly et al. entitled "Processing Data-Stream Join Aggregates Using Skimmed Sketches", published online in Feb. 2004, and as pp. 569-586 in "Lecture Notes in Computer Science", vol. 2992/2004, "Advances in Database Technology—EDBT 2004: 9th International Conference on Extending Database Technology, Heraklion, Crete, Greece, Mar. 14-18, 2004", edited by Elisa Bertino et al., published by Springer-Verlag, Heidelberg, Germany, 2004.

"Sketch-Based Multi-query Processing over Data Streams" by A. Dobra et al. in "Lecture Notes in Computer Science", vol. 2992/2004, "Advances in Database Technology—EDBT 2004: 9th International Conference on Extending Database Technology, Heraklion, Crete, Greece, Mar. 14-18, 2004", edited by Bertino et al., pp. 551-568, published by Springer-Verlag, Heidelberg 2004.

S. Ganguly et al. entitled "Processing Set Expressions over Continuous Update Streams" published in the "Proceedings of the 2003 ACM SIGMOD International Conference on Management of Data, San Diego, California, USA, Jun. 9-12, 2003", edited by A. Halevy et al. and published by Association for Computing Machinery (ACM), New York, NY 2003, ISBN 1-58113-634-X, pp. 265-276, (2003).

S. Ganguly et al, entitled "Tracking set-expression cardinalities over continuous update streams", published in The VLDB Journal: The International Journal on Very Large Databases, vol. 13, No. 4, Dec. 2004, pp. 354-369, published by Springer-Verlag, Heidelberg, 2004.

* cited by examiner

| | | | | | | | |
|---|---|---|---|---|---|---|---|
| $Q_1$ | 1,2 | $Q_9$ | 1 | $Q_{17}$ | 8,9 | $Q_{25}$ | 2,7 |
| $Q_2$ | 4,5 | $Q_{10}$ | 6,7 | $Q_{18}$ | 5,9 | $Q_{26}$ | 1,6 |
| $Q_3$ | 3,4,5 | $Q_{11}$ | 5,8 | $Q_{19}$ | 6,8 | $Q_{27}$ | 3,8 |
| $Q_4$ | 4,5,8 | $Q_{12}$ | 10 | $Q_{20}$ | 7,8 | $Q_{28}$ | 1,2,3 |
| $Q_5$ | 4,5,8,9 | $Q_{13}$ | 4 | $Q_{21}$ | 8 | $Q_{29}$ | 2,3,4 |
| $Q_6$ | 2 | $Q_{14}$ | 3 | $Q_{22}$ | 6 | | |
| $Q_7$ | 5 | $Q_{15}$ | 3,4 | $Q_{23}$ | 7 | | |
| $Q_8$ | 9 | $Q_{16}$ | 5,8 | $Q_{24}$ | 2,3 | | |

FIG. 8a  Average error (workload 1)

FIG. 8b  : Maximum error (workload 1)

FIG. 8c  Average error (workload 2)

FIG. 8d  : Maximum error (workload 2)

FIG. 8d  Average error (workload 3)

FIG. 8e  : Maximum error (workload 3)

SKETCH-BASED MULTI-QUERY PROCESSING OVER DATA STREAMS

FIELD OF THE INVENTION

The present invention relates to methods of estimating SQL-like queries over data-streams, and more particularly, to methods for optimizing workloads of multi-join queries over multiple data-streams.

BACKGROUND OF THE INVENTION

Traditional database management systems (DBMS) deal with persistent data sets that are reliably stored and may be accessed multiple times during any query. In several important application domains, however, data arrives continuously and needs to be processed in a single pass. Such continuous data-streams arise naturally in a number of applications including telecommunication networks, retail chain transactions and banking automated teller machine (ATM) transactions.

In order to monitor these data-streams and detect patterns that may, for instance, indicate fraudulent use, equipment malfunction or non-optimal configuration, it is necessary to query these data-streams in real time using algorithms that only have access to each data element in the stream once, in the arbitrary order in which the data element appears in the data-stream. Because of the limitations of the computers doing the monitoring it is also necessary that these algorithms use only a relatively small amount of memory. Moreover, the need for real-time answers means that the time for processing each element must also be small.

SUMMARY OF THE INVENTION

Briefly described, the present invention provides a method of efficiently providing estimated answers to multiple, concurrent, aggregate SQL-like queries over a number of input data streams. The method is capable of processing multi-join queries, only examines each data element in the data-stream once, uses a limited amount of computer memory and is effective on large volumes of data.

A multi-join query may be represented by a join query graph which has a distinct vertex v for each data-stream R referenced in the query, and a distinct, undirected edge e for each equality constraint of the query.

The approximate answer to a multi-join query may be obtained using the join graph and atomic sketches. The atomic sketches are essentially pseudo-random summaries of the data and may be represented mathematically by the equation:

$$X_v = \Sigma_{i_1 \in dom(A_v(e_1))} \cdots \Sigma_{i_k \in dom(A_v(e_k))} f_v(i_1, \ldots, i_k) \prod_{j=1}^{k} \xi_{i_j}^{e_j}.$$

where $X_v$ represents the atomic sketch at the vertex v of the join graph, A represents a join attribute of the query, f represents a frequency vector, $\xi$ represents a random binary variable, and i, j and k represent integers. An important constraint is that while the binary random variable associated with attributes from a common edge are shared, the binary random variable associated with attributes from distinct edges are independent.

The estimated answer to the query is then the product of all the atomic sketches for all the vertices in the join graph, i.e., the estimated answer to the query may be represented mathematically by the equation:

$$X_Q = \Pi_v X_v$$

where $X_Q$ represents the estimate for the query Q, and $X_v$ represents the atomic sketch for vertex v of the query's join graph.

In a preferred embodiment of the invention, a query workload of multiple, multi-join aggregate queries is processed efficiently by identifying and sharing atomic sketches common to distinct queries in the workload. Sketches that may be shared are identified by transforming the collection of join graphs representing the query workload into one or more transformed join graphs. In the transformed join graphs, vertices corresponding to the same data-stream R, and where the query concerns the same attribute A of R, are coalesced. In transforming the join graph it is, however, important to make sure that while the binary variables on the same edge are the same, the binary variables of distinct edges of a single query that share a common vertex are independent. Transformed join graphs in which the binary variables meet these requirements are said to be well-formed.

A further embodiment of the invention includes an algorithm that automatically produces well-formed transform join graphs and minimizes the average query error.

Another further embodiment of the invention includes an algorithm that produces well-formed transform join graphs and minimizes the maximum query error over the workload.

These and other features of the invention will be more fully understood by references to the following drawings.

DETAILED DESCRIPTION

The present invention relates to monitoring data-streams and particularly to performing real-time monitoring on data that is only seen once and in which data elements arrive in an arbitrary order.

A particularly desirable form of monitoring is to perform queries on these data-streams that are similar to the structured query language (SQL) queries performed on more traditional fixed data bases.

In particular, it is desirable to efficiently process workloads of multiple, concurrent aggregate SQL queries over a number of input data streams and provide reasonably accurate approximate answers to the queries when the data is arriving in a data-stream and each data element can only be examined once. The processing algorithms need to be capable of dealing with multi-join SQL-like queries and the answer needs to be provided in real time using limited computer memory.

The present invention relates to methods of efficiently providing estimated answers to workloads of multiple, concurrent, aggregate multi-join SQL-like queries over a number of input data streams. The methods are based on computing small, pseudo-random sketch synopses of the data. Furthermore, the methods only examine each data element in the data-stream once, use a limited amount of computer memory, are effective on large volumes of data and can accommodate both the insertion and deletion of data elements. By intelligently sharing sketches among concurrent queries of the workload, the present invention provides substantial improvements in the utilization of available space for storing sketches and in the quality of the approximation error guarantees.

Figure 2:
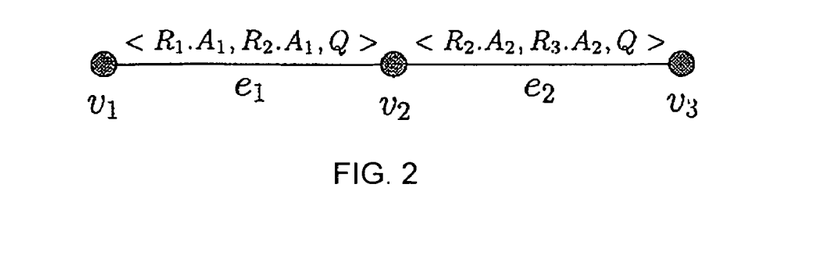
FIG. 2 is an example of a query join graph.

Multi-join queries may be represented by join query graphs having a distinct vertex v for each data-stream R referenced in the query, and a distinct, undirected edge e for each equality constraint of the query, as shown in FIG. 2 and detailed in, for instance, the article entitled "Sketch-Based Multi-query Processing over Data Streams" by A. Dobra et al. in "Lecture Notes in Computer Science", volume 2992/2004, "Advances in Database Technology—EDBT 2004: 9th International Conference on Extending Database Technology, Heraklion, Crete, Greece, Mar. 14-18, 2004", edited by Bertino et al., pp. 551-568, published by Springer-Verlag, Heidelberg 2004, the entire contents of which are hereby incorporated by reference, and which is herein after referred to as "Dobra et al.".

The approximate answer to a multi-join query may be obtained using the join graph and sketches that are essentially pseudo-random summaries of the data.

The basic technique of using sketches may be illustrated by considering how to estimate the size of a binary join of two data-streams $R_1$ and $R_2$ on attributes $R_1.A_1$ and $R_2.A_2$, i.e. the result of query $Q=COUNT(R_1|X|_{R1.A1=R2.A2}R_2)$, as the tuples of $R_1$ and $R_1$ stream in. If dom(A) denotes the domain of an attribute A and $f_{R(i)}$ is the frequency of attribute value i, then the answer to the query is given by the expression $Q=\Sigma_{i \in dom(A1)} f_{r1}(i) f_{r2}(i)$, i.e., the inner product of the frequency vectors. In order to estimate this answer, a random variable $X_Q$ can be defined, such that it is easily computed over streaming values, is an unbiased estimator for the join size and allows probabilistic guarantees on the quality of the estimate. This may be done by:

1). Selecting a family of four-wise independent binary random variables $\{\xi_i : i=1, \ldots |dom(A_1)|\}$, where each $\xi_i \in \{-1, +1\}$ and the probability $P|\xi_i=+1|=P|\xi_i=+1|=\frac{1}{2}$.

2). Defining $X_Q=X_1.X_2$ where $X_k=\Sigma_{i \in dom(A1)} f_{r1}(i)\xi_i$ for k=1,2.

$X_Q$ is then an estimate of Q, i.e., an estimate of the required answer. $X_k$ is a randomized linear projection of the frequency vector of $R_k.A_k$ and the vector $\xi$. $X_k$ can be efficiently generated by starting with $X_k$ equal to zero, and adding $\xi_i$ to it whenever the ith value of $A_k$ appears in the stream.

The quality of the estimation guarantees of such a sketch based estimation can be improved using a standard boosting technique that maintains several independent, identically-distributed, instantiations of the above process, and uses average and median selection over the $X_Q$ estimates to boost accuracy and probabilistic confidence, as detailed in, for instance, Dobral et al.

This basic sketch based technique can be extended to approximate the result of general, multi-join aggregate SQL-like queries over a collection of streams, as will now be described in detail by reference to the accompanying drawings.

Figure 1:
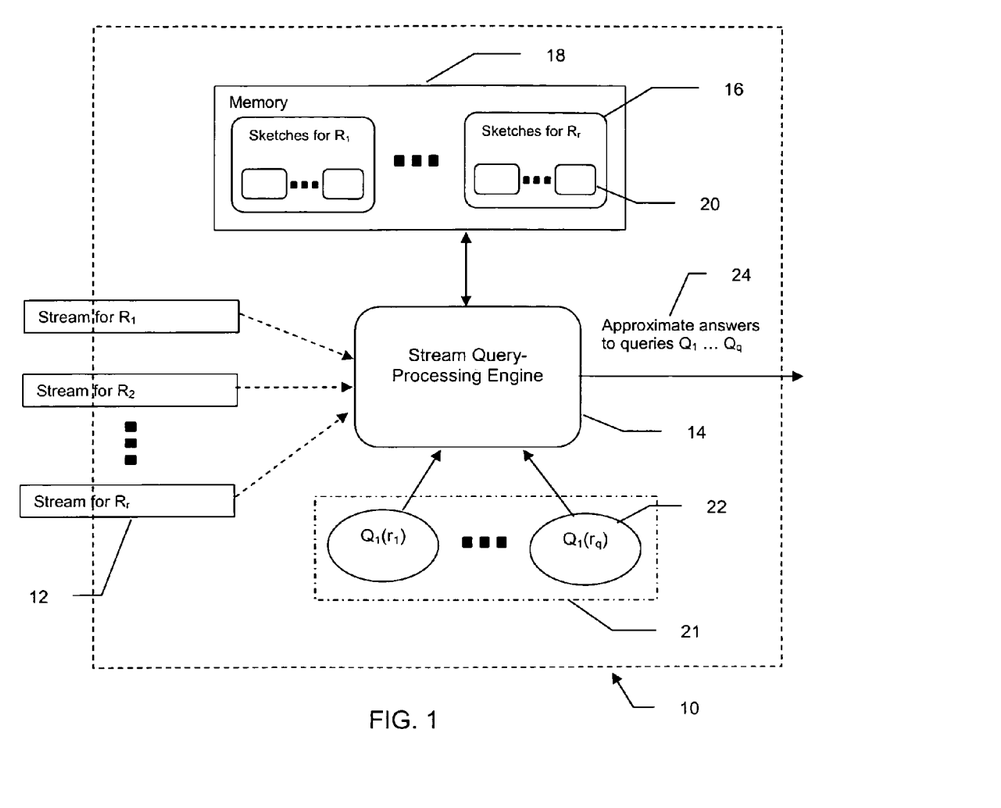
FIG. 1 is a schematic overview of a multi-query processing architecture.

FIG. 1 is a schematic representation of a stream query processing architecture 10, comprising data-streams 12, a stream query processing engine 14, a synopsis 16 for each data-stream 12, atomic sketches 20, computer memory 18, a query workload 21, SQL-like queries 22 and approximate answers 24 to the queries. The synopsis 16 comprises one or more atomic sketches 20 and is stored on computer memory 18. The query workload 21 comprises one or more SQL-like queries 22.

The R data-streams 12 are all unordered sequences of elements. The element values may themselves be vectors or have vectors associated with them. These vectors may include values that indicate if the data elements are insert or delete operations.

In contrast to conventional database management systems (DBMS), the stream query processing engine 14 only sees each data element in streams 12 once and in the fixed order in which the elements happen to arrive. The order of element arrival in each stream is arbitrary, and elements with duplicate values can occur anywhere over the duration of the stream.

The computer memory 18 is small compared to the number of data elements in the data-streams and is used to maintain a concise and accurate synopsis of each data-stream, each synopsis 16 comprising one or more atomic sketches 20 for data-steams 12. The main constraints on each synopsis are (1) that it is much smaller than the total number of data elements (also known as "tuples") in the data stream, in particular that its size is logarithmic or poly-logarithmic with respect to the size of the data-stream, and (2) that the synopsis can be computed in a single pass over the tuples in the data-stream, in any, arbitrary order of their arrival. Furthermore, at any point in time, the query processing algorithms must be able to combine the maintained synopses to produce an approximate answer to all queries 22 in the query workload 21.

The query workload 21 may be represented mathematically as $\mathcal{Q}=\{Q_1, \ldots Q_q\}$, i.e., a collection of arbitrary, SQL-like queries over a set of relations $R_1 \ldots R_e$, with each query typically referencing a subset of the relations/attributes in the input.

FIG. 2 shows an example of a join graph $\mathcal{A}$Q) of a query Q. The join graph has a distinct vertex v for each stream R referenced by the query. For each equality constraint, $R_i.A_j=R_k.A_l$ there is a distinct edge e which is labeled with the triple $<R_i.A_j, R_k.A_l, Q>$.

The join graph $\mathcal{A}$Q) can be used to represent a multi-join query Q of the form: "SELECT COUNT FROM R1, ... Rr WHERE ϵ", where ϵ represents the conjunction of n equi-join constraints of the form $R_i.A_j=R_k.A_l$. The result of Q is the number of tuples in the cross-product $R_1, \ldots R_r$ that satisfy the equality constraints over the join attributes.

An unbiased, bounded-variance probabilistic estimate $X_Q$ for Q can be constructed using atomic sketches built on the join graph $\mathcal{A}$Q). More specifically, for each edge e of the join graph a family of four-wise independent random variables $\xi^e$ is selected, where $\xi^e=\{\xi^e_i: i=1, \ldots |dom(A_v(e))|\}$, where each $\xi^e_i \in \{-1, +1\}$. It is important that while an equi-join attribute pair that share an edge also share a random variable, equi-join attributes of a give query that are on distinct edges e having a common vertex v use independent random variables.

Let $e_1, \ldots, e_k$ be the edges incident on v and, for $i_1 \in \text{dom}(A_v(e_i)), \ldots i_k \in \text{dom}(A_v(e_k))$, let $f_v(i_1, \ldots, i_k)$ denote the number of tuples in R(v) that match values $i_1, \ldots, i_k$ in their join attributes. Then the atomic sketch at v may be represented as:

$$X_v = \Sigma_{i_1 \in dom(A_v(e_1))} \cdots \Sigma_{i_k \in dom(A_v(e_k))} f_v(i_1, \ldots, i_k) \Pi_{j=1}^{k} \xi_{i,j}^{e_j}.$$

The estimated answer to the query is then the product of all the atomic sketches for all the vertices in the join graph, i.e., the estimated answer to the query may be represented mathematically by the equation:

$$X_Q = \Pi_v X_v$$

where $X_Q$ represents the estimate for the query Q, and $X_v$ represents the atomic sketch for vertex v of the query join graph.

Each atomic sketch Xv can be efficiently computed as the tuples of R(v) stream in, by initially setting Xv to zero and then adding $\Pi_{j=1}^{k} \xi_{t.Av(ej)|}^{ej}$ to it for each tuple t in the stream.

Figure 3:
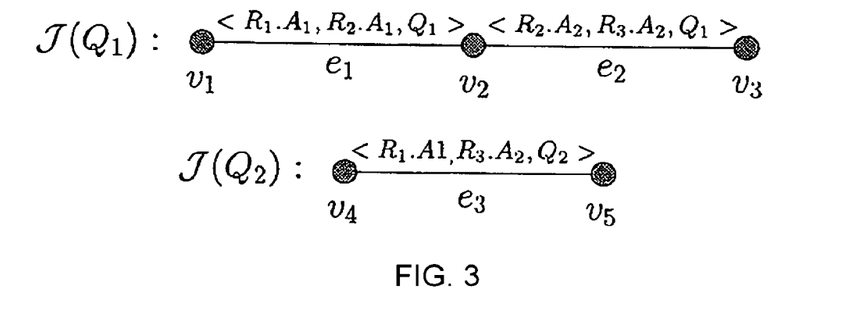
FIG. 3 is an example of a query workload with sketch-sharing potential.

FIG. 3 shows a workload of join query graphs with sketch-sharing potential. Given a query workload $\mathcal{Q} = \{Q_1, \ldots Q_q\}$, of multi-join queries, a straightforward way to process the data is to build a join graph $\mathcal{A}(Q)$ for each muli-join query, and then to construct atomic sketches for each of the vertices of the join graph. The atomic sketches for each vertex of the join graph can then be combined to produce and estimated answer. In many instances, however, a relationship R may appear in multiple queries. For instance, in the workload of FIG. 3, the relation $R_1.A_1$ appears in both edges $e_1$ and $e_3$ and the relation $R_3.A_2$ appears in both edges $e_2$ and $e_3$.

A naïve approach to processing the workload of FIG. 3 would set up five atomic sketches, one for each vertex $v_1 \ldots v_5$, requiring three families of binary random variables $\xi$, one for each edge $e_1 \ldots e_3$.

Figure 4A:
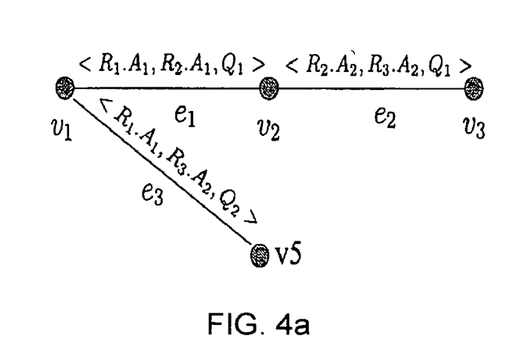
FIG. 4a is an example of a well-formed join graph using sketch-sharing.

Because, relation $R_1.A_1$ appears in both edges $e_1$ and $e_3$ a more economic way to evaluate the work load is to use the same atomic sketch for $R_1.A_1$ for both edges $e_1$ and $e_3$, a with a single binary random variables $\xi$ for both edges. This reduces the total number of atomic sketches that need to be maintained to four and uses only two families of binary random variable. FIG. 4a shows the join graph coalesced to take advantage of this common vertex.

Figure 4B:
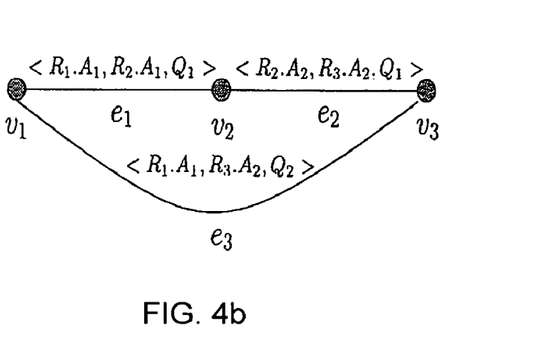
FIG. 4b is an example of a join graph that is not well formed.

FIG. 4b shows an attempt to coalesce the join graph further because of the additional observation that the relation $R_3.A_2$ appears in both edges $e_2$ and $e_3$. This further coalescence of vertices, however, results in a join graph that is ill-formed, because it has the contradictory requirements that edges $e_1$, $e_2$ and $e_3$ use the same, non-independent, family of random binary variables $\xi$ and that edges $e_1$ and $e_2$ each use a different, independent family of random binary variables $\xi$. This contradiction arises because $e_1$ and $e_3$ share an atomic sketch and therefore require the same family of binary variables. Furthermore, in the ill-formed coalescence represented in FIG. 4b, $e_2$ and $e_3$ also share an atomic sketch so they also need to use the same binary variable. However, because $e_1$ and $e_2$ share a common vertex in the same query, they require independent families of random binary variables.

This problem of when a coalesced join graph is well-formed can be formalized by introducing a notion of transitive $\xi$-equivalence among edges of a multi-query graph. Two edges $e_1$ and $e_2$ are defined to be $\xi$-equivalent if either (1) $e_1$ and $e_2$ are incident on a common vertex and $A_v(e_1) = A_v(e_2)$; or (2) there exists an edge $e_3$ such that $e_1$ and $e_3$ are $\xi$-equivalent and $e_2$ and $e_3$ are $\xi$-equivalent.

A well-formed join graph can then be defined as one in which, for every pair of $\xi$-equivalent edges, the queries containing the edges are distinct.

Given a large workload of complex queries, they may be a large number of well-formed join graphs, all of which can be used to provide approximate answers to the queries. Since a key resource constraint in a data-streaming environment is the amount of memory available to the query processor, an important objective is to compute approximate answers to the queries in the workload that are as accurate as possible, given a fixed amount of memory. So, in addition to computing well-formed join graphs for a workload of queries, it is also important to be able to allocate memory to the various vertices of the graphs so than an appropriate aggregate error, such as the average or maximum error, is minimized over all queries in the workload.

One method of finding the minimum average error is to find groups of nodes and edges that have the same memory allocation in the optimal solution. These groups are called equivalent-components (≡-components).

In a preferred embodiment of the invention, a query workload of multiple, multi-join aggregate queries are processed efficiently by identifying and sharing sketches common to distinct queries so that the average error over the workload is minimized. Sketches that may be shared are identified by transforming the collection of join graphs representing the query workload into one or more transformed join graphs in which common vertices are coalesced, i.e., vertices corresponding to the same data-stream R, and where the query concerns the same attribute A of R, are joined. In transforming the join graph, however, it is important to make sure that, while the binary variables on the same edge are the same, the binary variables of distinct edges that share a common vertex are independent. Transformed join graphs in which the binary variables meet these requirements are said to be well-formed.

TABLE 1

Algorithm for allocating space for queries in a workload.

Algorithm 1: ComputeSpace(J, M)

Require: J is a join graph, M is available memory.
Ensure: vector of $m_Q$'s, associated error.
1: V = J ∪ Q
2: E = {(v,Q) : v ∈ J,Q ∈ Q(v)}
3: C = ∅
4: repeat
5:     C' = FindConnectedComponents(V,E)
6:     for all C ∈ C' do
7:        E' = SelectEdges(C)
8:        E = E\E'
9:        if E' = ∅
10:          V = V\C
11:          C = C ∪ C
12:        endif
13:     end for
14: until (V = ∅)
15: return ComputeMemory&Error(C,M)

Table 1 outlines an algorithm ComuputeSpace that, for a given join graph J and a given amount of space M in which to store sketches, provides a set of components $\mathcal{C}$ that characterize the optimal solution for space allocation. The components $\mathcal{C}$ can be used to calculate the optimal values of the space $M_Q$ required for each query Q, and the space $m_v$ for each vertex v, in the workload $\mathcal{Q}$ and the associated error.

When using the sketches of the preferred embodiment of this invention, it is also necessary that the join graph J is well formed, as detailed above.

Formal proofs of algorithm ComuputeSpace and its associated algorithms are described in detail in Dobra et al., while the following description represents an overview of the relevant function of the steps of the algorithm.

In steps 1-3, algorithm ComuputeSpace is initialized to contain all the components in the well formed join graph J, and to make the optimized set of components $\epsilon$ initially equal to zero.

In step 5, all the components in the join graph are examined to identify connected components.

In steps 6-14, the algorithm loops though all the connected components and deletes from the set of edges E a subset of edges E' that connect between pairs of distinct $\equiv$-components, until $\epsilon$ contains the final set of $\equiv$-components.

As defined in Dobra et al, distinct $\equiv$-components are ones that satisfy the following conditions:

(a) Let $C, C' \in C$ and $C \neq C'$. Then $\forall v \in V(C), \forall Q \in Q(C')$, it is the case that $\tilde{\mu}_{v,Q} = 0 \,\hat{}\, M(C) \geq M(C')$.

(b) For any $\equiv$-component C, $$\forall Q \in Q(C): W_Q \cdot \frac{|V(C)|}{W(C)} = \sum_{v \in V(C)} \bar{\mu}_{v,Q}$$

$$\forall v \in V(C): \sum_{Q \in Q(v) \cap Q(C)} \bar{\mu}_{v,Q} = 1$$

(c) The memory allocation for the $\equiv$-components satisfies the following two equations:

$$\forall C \in C: -W(C)\Phi'(M(C)) = \lambda|V(C)|$$

$$\sum_{C \in C} M(C) \cdot |V(C)| = M$$

(d)

$$\forall C, C' \in C: M(C) < M(C') \text{ iff } \frac{w(c)}{|v(c)|} < \frac{w(c')}{|v(c')|}$$

where the weight $W_Q$ of query Q is given by the appropriate multiple of the variance of the query atomic sketch over the squared error of the atomic sketch, i.e., $W_Q = 8\text{Var}[X_Q]/E[X_Q]^2$. $W_Q$ is a constant for each query Q for a given, fixed confidence parameter $\delta$. As long as there is some historical information or a coarse a-priori knowledge of the data distributions, $E[X_Q]$ and $\text{Var}[X_Q]$ can be obtained by estimating join and self-join sizes. $W(C)$ is the combined weights of all the queries in component C.

The algorithm SelectEdges, shown in table 2 below, computes the set of edges E' that need to be deleted.

In step 15 of algorithm ComuputeSpace, the two equations above that define the memory allocation of $\equiv$-components are solved to provide the optimal memory allocation $M_Q$ that minimizes the error $\Sigma_Q W_Q \Phi(M_Q)$, where $\Phi$ is an arbitrary convex, strictly decreasing function This average error optimization algorithm can be used for multi-query processing irrespective of the summarization technique used as long as the error is a strict concave function of the size of the summary, which is almost always the case.

TABLE 2

Algorithm SelectEdges.

Algorithm 2: SelectEdges (C)

Require: C is a component.
Ensure: Returns the set of edges to be deleted from C.
1: MF = Maxflow(F(C))
2: $S_F$ = Forward-Mark(C,MF)
3: $S_B$ = Backward-Mark(C,MF)
4: return $\{(v,Q) : v \in V(C) \,\hat{}\, Q \in Q(C) \cap Q(v) \,\hat{}\, ((Q \in S_F \,\hat{}\, v \in S_F) \vee (Q \in S_B \,\hat{}\, v \in S_B))\}$ Table 2 shows the steps of algorithm SelectEdges, which identifies the edges between $\equiv$-components that can be eliminated. The algorithm uses a max-flow solution of the flow graph of C. A flow graph of a component is a directed graph with capacity on the edges. The max-flow solution may be found by any well-known technique such as, but not limited to, the Ford-Fulkerson algorithm.

In steps 2 and 3, SelectEdges uses the algorithms Forward-Mark and Backward-Mark, detailed below in tables 3 and 4, to provide sets of edges $S_F$ and $S_B$ that are sets of vertices reachable in C from unsaturated v and Q vertices respectively, but which do not traverse 0-flow edges.

In step 4, SelectEdge identifies the vQ edges that span $S_F$ and $S_B$, i.e., the edges between $\equiv$-components.

TABLE 3

Algorithm Forward-Mark: Provides sets of edges
$S_F$ that are sets of vertices reachable in C from unsaturated v vertices.

Algorithm 3: Forward-Mark(C, MF)

Require: C is a component, MF is a max-flow solution of F(C).
Ensure: All vertices in components from $T_<$.
1: $S = \{v : v \in V(C) \,\hat{}\, MF(s,v) < 1\}$
2: repeat
3:   S' = S
4:   $S = S \cup \{v : Q \in S \,\hat{}\, v \in V(C) \cap V(Q) \,\hat{}\, MF(v,Q) > 0\}$
5:   $S = S \cup \{Q : v \in S \,\hat{}\, Q \in Q(C) \cap Q(v)\}$
6: until (S' = S)
7: return S Table 3 shows the steps of algorithm Forward-Mark, which finds the set S of vertices reachable from an unsaturated v vertex in a component of a flow graph with out traversing any 0-flow edges from a Q vertex to a v vertex.

TABLE 4

Algorithm Backward-Mark: Provides sets of edges $S_B$ that are sets of vertices reachable in C from unsaturated Q vertices.

Algorithm 4: Backward-Mark(C, MF)

Require: C is a component, MF is a max-flow solution of F(C).
Ensure: All vertices in components from $T_>$.
1: $S = \left\{Q : Q \in Q(C) \wedge MF(Q, t) < W_Q \frac{|V(C)|}{W(C)}\right\}$
2: repeat
3: S' = S
4: $S = S \cup \{v : Q \in S \wedge v \in V(C) \cap V(Q)\}$
5: $S = S \cup \{Q : v \in S \wedge Q \in Q(C) \cap Q(v) \wedge MF(v, Q) > 0\}$
6: until (S' = S)
7: return S Table 4 shows the steps of algorithm Backward-Mark, which finds the set S of vertices reachable from an unsaturated Q vertex in a component of a flow graph with out traversing any 0-flow edges from a Q vertex to a v vertex.

Figure 5A:
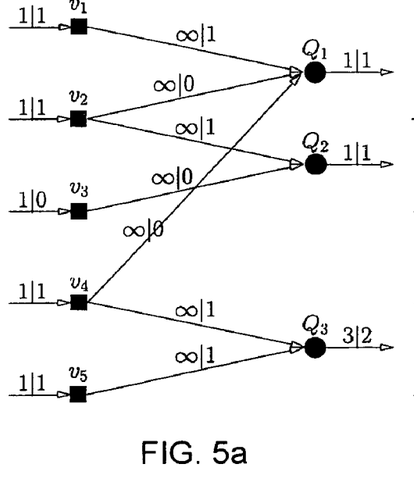
FIGS. 5a-b show a flow graph over two iterations of the ComputeSpace algorithm.
Figure 5B:
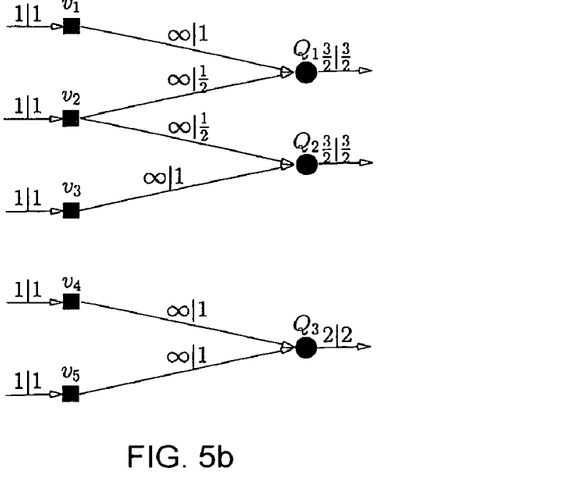

FIGS. 5a and 5b show a flow graph over two iterations of algorithm ComputeSpace. The flow graph F(C) shown in FIGS. 5a and 5b is for a join graph J with vertices $v_1, \ldots, v_5$ and represents workload $Q=\{Q_1, Q_2, Q_3\}$, with $V(Q_1)=\{v_1, v_2, v_4\}$, $V(Q_2)=\{v_2, v_3\}$ and $V(Q_3)=\{v_4, v_5\}$, having the query weights $W_{Q1}=W_{Q2}=3$ and $W_{Q2}=9$.

FIG. 5a shows the flow graph F(C) for the initial connect component C invoked by SelectEdges in a first iteration of algorithm ComputeSpace. Each edge in the flow graph is labeled with its capacity and the max-flow that can be pushed along that edge. For instance, the capacity for the edge out of $Q_1$ is $W_{Q1} \cdot |V(C)|/W(C) = 3.5/15 = 1$. All the vertices in FIG. 5a are saturated, except $v_3$ and $Q_3$.

In this first iteration, the call to algorithm Backward-Mark returns the set $S_F=\{v_1, v_2, v_3, Q_1, Q_2\}$, i.e., the set of vertices reachable from unsaturated vertex $v_3$ without traversing a 0-flow edge from a Q vertex to a v vertex.

The call to algorithm Forward-Mark in the same iteration returns the set $S_B=\{v_4, v_5, Q_3\}$, i.e., the set of vertices reachable from unsaturated query $Q_3$ without traversing any 0-flow edges from a Q vertex to a v vertex.

Since $v_4 \in S_B$ and $Q_1 \in S_F$, the edge $(v_4, Q_1)$ is between =-components, and is returned by SelectEdges as an edge to be deleted from the edge set E.

In the second iteration, ComputeSpace now invokes SelectEdges with the components shown in FIG. 5b, i.e., $C_1=\{v_1, v_2, v_3, Q_1, Q_2\}$ and $C_2=\{v_4, v_5, Q_3\}$, with the edge $(v_4, Q_1)$ having been deleted. The new edge capacities and max-flows for each component are shown in FIG. 5b. For instance, the capacity for the edge out of $Q_1$ is now $W_{Q1} \cdot |V(C_1)|/W(C_1) = 3.3/6 = 3/2$.

Since there are no unsaturated edges in either component $C_1$ or $C_2$, calls to Forward-Mark and Backward-Mark are moot, and algorithm SelectEdges returns nothing. ComputeSpace therefore terminates and returns the optimal memory allocation component set $\mathcal{C}=\{C_1, C_2\}$. Solving for the two equations above that the memory allocation for =-components must satisfy, yields the results $M(Q_1)=M(Q_2)=m_{v1}=m_{v2}=m_{v3}=M(C_2)=M/6$ and $M(Q_3)=m_{v4}=m_{v5}=M(C_2)=M/4$.

The final step is to go from this optimal continuous solution to a near-optimal integer solution by rounding down each of the M(Q) returned by the algorithm ComputeSpace. The average-error for the rounded down solution can be shown to be not too far from the average-error for the optimal integral Solution, as detailed in Dobra et al.

In a further embodiment of the present invention, memory can also be allocated to the vertices of J to minimize the maximum query error in the workload, rather than the average error in the workload. This can be achieved by using a simple max-min linear optimization algorithm. That this is possible may be seen by first rewriting the objective function in the following way:

$$\min_{Q \in Q} \left\{ \frac{M_Q}{W_Q} \right\} = \min_{Q \in Q} \left\{ \frac{\min_{v \in V(Q)} \{m_v\}}{W_Q} \right\}$$

$$= \min_v \left\{ m_v \min_{Q \in Q(v)} \frac{1}{W_Q} \right\}$$

$$= \min_v \left\{ \frac{m_v}{\max_{Q \in Q(v)} W_Q} \right\}$$

Since $\max_{Q \in Q(v)} W_Q$ is a constant for a given vertex v, the transformation above shows that the maximum error problem is substantially equivalent to a linear max-min optimization which can be solved by standard techniques. For example, a simple, optimal, algorithm that solves this problem is the following: first compute the optimal continuous solution, where each $m_v$ is simply proportional to $\max_{Q \in Q(v)} W_Q$; then round down each $m_v$ component to the nearest integer. Any remaining space is then allocated by applying one extra unit of space to each of the nodes with the s smallest values of $m_v / \max_{Q \in Q(v)} W_Q$.

When the algorithm ComputeSpace detailed above is used with the sketches of the preferred embodiment of the invention, a further constrain on the join graph, $\mathcal{J}(Q)$ is that it is well formed, as detailed above. The algorithm CoalesceJoinGraphs in table 5 is a greedy heuristic for computing such a well-formed join graph with small error.

TABLE 5

Algorithm CoalesceJoinGraphs

Algorithm 5: CoalesceJoinGraphs(Q, M)

Require: Q is query workload, M is available memory.
Ensure: Returns a well-formed join graph $\mathcal{J}(Q)$.
1: J = $\cup_{Q \in Q} \mathcal{J}(Q)$
2: (m, err) = ComputeSpace(J, M)
3: flag = true
4: while (flag = true) do
5:   cur_err = ∞
6:   flag = false
7:   for all pairs of vertices $v_i, v_j$ in J such that $R(v_i) = R(v_j)$ and $A(v_i) = A(v_j)$ do
8:     Let J' be the join graph after $v_i$ and $v_j$ are coalesced in J
9:     (m', err') = ComputeSpace(J', M)
10:    if (err' < cur_err and J' is well-formed) then
11:      cur_err = err'
12:      cur_J = J'
13:    end if
14:  end for
15:  if (cur_err ≤ err) then
16:    err = cur_err TABLE 5-continued Algorithm CoalesceJoinGraphs Algorithm 5: CoalesceJoinGraphs(Q, M)

17:     J = cur_J
18:       flag = true
19:   end if
20: end while
21: return (J, ComputeSpace(J, M))

Given a query workload, the algorithm CoalesceJoin-Graphs of table 5 returns a well-formed graph. In the main while loop of the algorithm, i.e., from lines 4 to 19, pairs of vertices that minimize the error are coalesced. In each iteration, the algorithm ComputeSpace is used to compute the error and determine which pair of vertices, if coalesced, minimizes the error. This process is repeated until the error cannot be reduced further. In order to ensure that the join graph J is always well-formed, the join graph is initially set to be equal to the set of all the individual join graphs for the queries in the workload. In subsequent iterations, only vertices for identical relations that have the same attribute sets, and preserve the well-formedness of J, are coalesced.

In step 10 of the algorithm CoalesceJoinGraph, the well-formedness of the graph is checked. This is done efficiently, in a time proportional to the number of edges in J', by first partitioning the edges into equivalence classes of $\xi$-equivalent edges, and then checking that none of them contains multiple edges from the same query.

Figure 6:
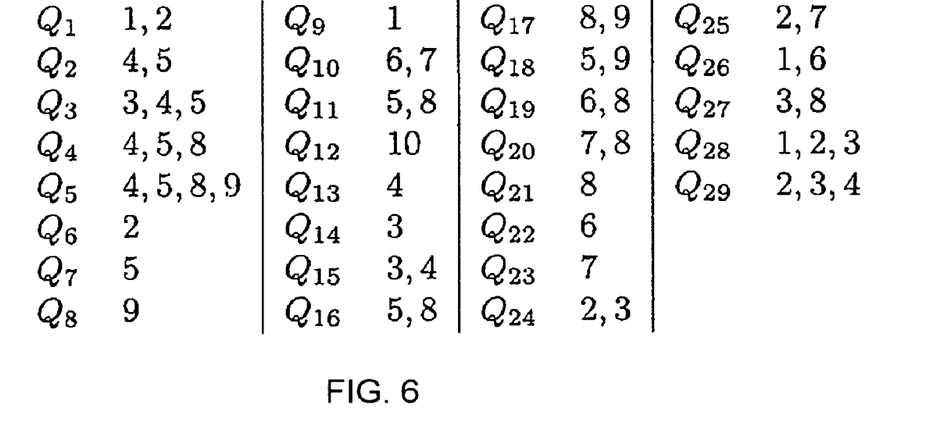
FIG. 6 shows a table of standard SQL queries of the Transaction Processing Performance Council decision support benchmark (TCP-H) business oriented ad-hoc queries and concurrent data modifications.
Figure 7:
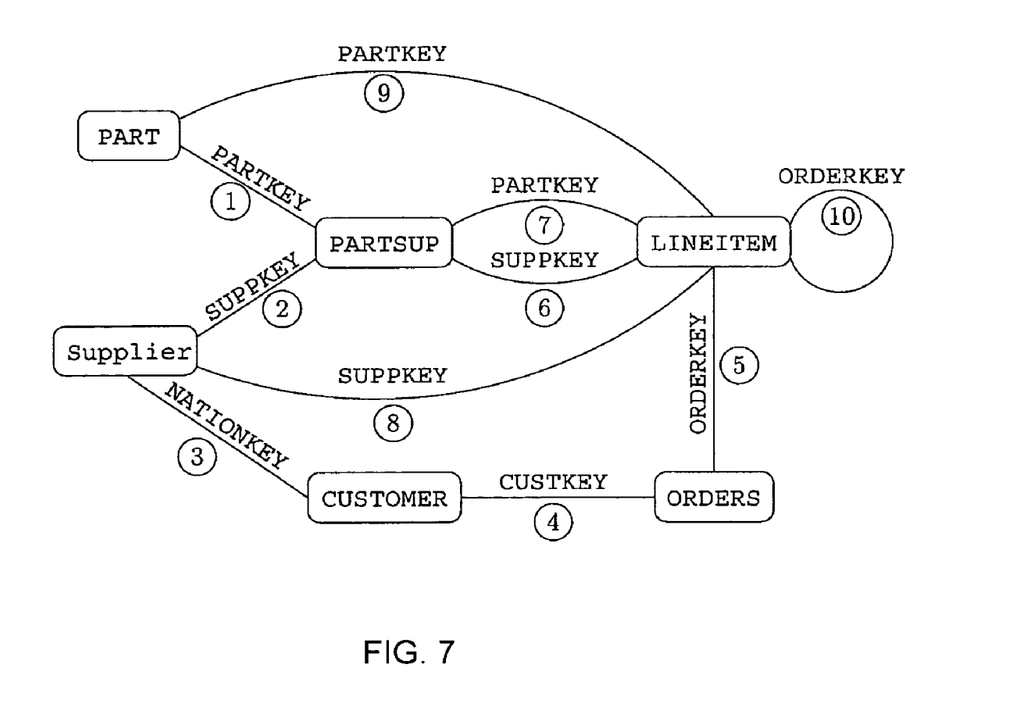
FIG. 7 shows the relations, join attributes and equi-join constraints for the TCP-H schema.
Figure 8A:
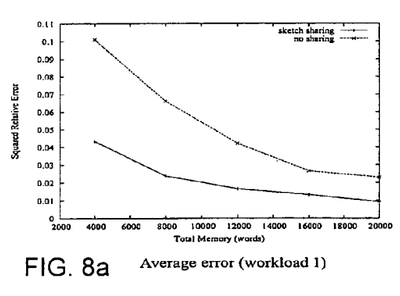
FIG. 8 shows experimental results comparing sketch sharing with not sharing sketches.
Figure 8B:
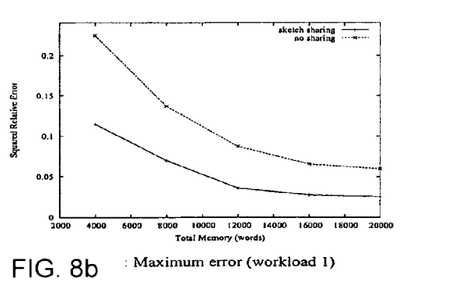
Figure 8C:
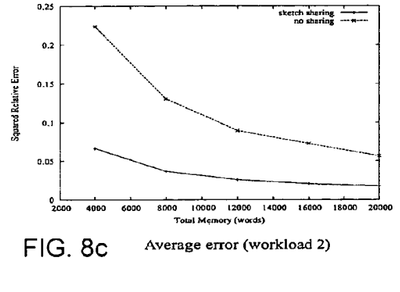
Figure 8D:
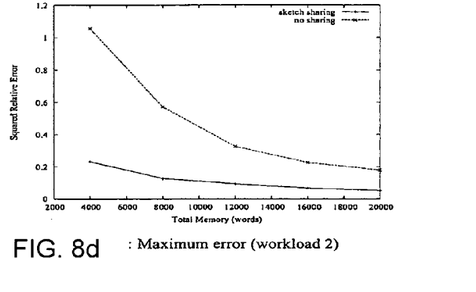
Figure 8E:
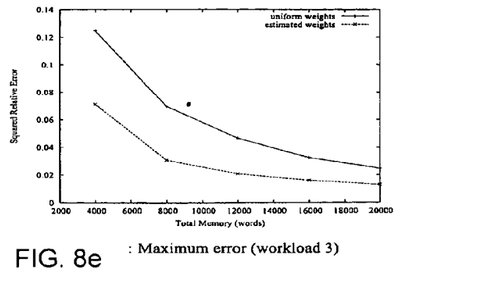

FIG. 6 shows a table of a subset of standard queries of the Transaction Processing Performance Council's decision support benchmark (TCP-H). This TCP-H benchmark consists of business oriented, ad-hoc queries and concurrent data modifications. These queries all use the relations, join attributes and equi-join constraints for the TCP-H schema, shown in FIG. 7.

The algorithms presented above have been tested experimentally using three workloads chosen from the table of FIG. 6.

Workload 1 consists of queries Q1 through Q12, which are the standard TCP-H queries that only contain equi-join constraints.

Workload 2 consists of queries Q1 through Q29 and was selected to get a feel for the benefits of sketch sharing as the degree of sharing increased. Workload 2 has a larger number of queries that are over the same relations. A bigger improvement from sketch sharing is therefore expected in processing workload 2 than the improvement obtained from sketch sharing when processing workload 1.

Workload 3 consists of queries Q6 to Q12 and Q28, and is used to demonstrate the accuracy gains obtained as a result of using non-uniform query weights.

Experimental results show that the accuracy of the query estimates over a workload is improved significantly by using the sketch sharing method of this invention. For instance, in one particular experiment, errors were generally a factor of two smaller with sharing, and are even greater with workload 2. The results are discussed in greater detail in Dobra et al.

The above-described steps can be implemented using standard well-known programming techniques. Software programming code which embodies the present invention is typically stored in permanent memory of some type, such as permanent storage of a workstation located at Bell Labs of Lucent Technologies in Murry Hill, N.J. In a client/server environment, such software programming code may be stored in memory associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of obtaining estimated answers to two or more aggregate queries over one or more data-streams to detect patterns in said data-streams, said method comprising the steps of:

obtaining one or more data elements from said data-streams;
   selecting one or more random variables;
   generating one or more atomic sketches using said data elements and said random variables;
   producing estimated answers to said two or more aggregate queries using at least one atomic sketch that is shared by at least two of said two or more aggregate queries; and examining said estimated answers to detect patterns in said data-streams.

2. The method of claim 1 further comprising the step of representing said aggregate queries by one or more join graphs, said join graphs comprising two or more vertices and one or more edges.

3. The method of claim 2 wherein said random variables are binary variables and collectively comprise a vector having an element value for each domain value of the data stream, and wherein half of said element values are +1 and half of said element values are −1.

4. The method of claim 3 wherein generating said atomic sketches further comprises generating an atomic sketch for each vertex of in said join graphs, and wherein said atomic sketches each comprise a sum of a frequency vector for data-streams associated with said vertex multiplied by a product of said random variables associated with said vertex, said atomic sketch represented mathematically by the equation $$X_v = \Sigma_{i_1 \in dom(A_v(e_1))} \cdots \Sigma_{i_k \in dom(A_v(e_k))} f_v(i_1, \ldots, i_k) \Pi_j^{k=1} \xi_{i_j}^{e_j}.$$

where X represents said atomic sketch as said vertex v, A represents a join attribute, f represents said frequency vector, ξ represents said random binary variable, i, j and k represent integers, and wherein the binary random variable associated with attributes A from a common edge are shared, and the binary random variable associated with attributes from distinct edges are independent.

5. The method of claim 4, wherein producing estimated answers to said two or more aggregate queries further comprises the mathematical product of all said atomic sketches for all said vertices in said join graph, i.e. said estimated answers may be represented mathematically by the equation $$X_Q = \Pi_v X_v$$

where $X_Q$ represents the estimate for the query Q, and $X_v$ represents the atomic sketch for vertex v of said join graph.

6. The method of claim 5 further wherein said representing said aggregate queries by one or more join graphs comprises producing at least two join graphs; and wherein said using at least one common atomic sketch further comprises the step of transforming said at least two join graphs to form one or more transformed join graphs.

7. The method of claim 6 wherein said one or more transformed join graphs are well-formed graphs, said well-formed graphs having said binary random variables such that said binary random variables on a single edge are the same and said binary random variables on distinct edges are independent.

8. The method of claim 7 wherein said step of transforming said at least two join graphs further comprises minimizing a maximum query error over all said aggregate queries in a workload of queries.

9. The method of claim 7 wherein said step of transforming said at least two join graphs further comprises minimizing an average query error over all said aggregate queries in a workload of queries.

10. A computer-readable medium for estimating two or more aggregate queries over one or more data-streams to detect patterns in said data-streams, comprising instructions for:

obtaining one or more data elements from said data-streams;

selecting one or more random variables;

generating one or more atomic sketches using said data elements and said random variables;

producing estimated answers to said two or more aggregate queries using at least one common atomic sketch of said one or more sketches; and examining said estimated answers to detect patterns in said data-streams.

11. A computing device for effectively processing a workload of queries over a number of input streams to detect patterns in said data-streams, comprising:

a computer-readable medium comprising instructions for:

representing said workload as a join graph;

coalescing said join graph to a set of equivalent components requiring a minimum storage space;

providing pseudo-random summaries for each of said equivalent components;

estimating answers to said queries using said; and examining said estimated answers to detect patterns in said data-streams.

12. The computing device of claim 11 wherein said instructions for coalescing comprise instructions for eliminating one or more edges of said join graph that connect between equivalent components.

13. The computing device of claim 12 where said pseudo-random summaries comprise atomic sketches related to said queries, and wherein said instructions for estimating answers comprise instructions for calculating the mathematical product of said atomic sketches relevant to each of said queries.

* * * * *